United States Patent [19]
Anderson

[11] Patent Number: 6,066,255
[45] Date of Patent: May 23, 2000

[54] BELT TYPE FILTRATION APPARATUS FOR INDUSTRIAL LIQUIDS HAVING MULTIPLE SIZED DEBRIS

[75] Inventor: Raymond Anderson, Walled Lake, Mich.

[73] Assignee: H. R. Black Co., Warren, Mich.

[21] Appl. No.: 09/299,346

[22] Filed: Apr. 26, 1999

[51] Int. Cl.[7] .................. B01D 33/056; B01D 29/09; B01D 36/04; B23Q 11/00
[52] U.S. Cl. .................. 210/297; 210/298; 210/320; 210/400
[58] Field of Search .................. 210/167, 168, 210/400, 401, 393, 295, 297, 298, 299, 320

[56] References Cited

U.S. PATENT DOCUMENTS

| | | |
|---|---|---|
| 3,087,620 | 4/1963 | Hirs . |
| 3,197,030 | 7/1965 | Black . |
| 3,706,378 | 12/1972 | Markwick .................. 210/107 |
| 3,807,559 | 4/1974 | Horn . |
| 4,172,035 | 10/1979 | Adams . |
| 4,242,205 | 12/1980 | Hirs .................. 210/400 |
| 4,390,428 | 6/1983 | Bratten . |
| 4,440,642 | 4/1984 | Frese . |
| 5,089,143 | 2/1992 | Anderson .................. 210/741 |
| 5,167,839 | 12/1992 | Widmer, II . |

FOREIGN PATENT DOCUMENTS

| | | |
|---|---|---|
| 63-278741 | 11/1988 | Japan . |
| 9-300171 | 11/1997 | Japan . |

*Primary Examiner*—Thomas M. Lithgow
*Attorney, Agent, or Firm*—Charles W. Chandler

[57] ABSTRACT

An apparatus for filtering machine coolant which includes a filtering belt conveyor having a series of bars on the outer surface of the filtering belt conveyor. The filtering belt conveyor is located inside of a tank along with a separate drag conveyor which removes fines that are sprayed off the filtering belt conveyor. There is a partition in the tank between the filtering belt conveyor and the separate drag conveyor.

9 Claims, 3 Drawing Sheets

BELT TYPE FILTRATION APPARATUS FOR INDUSTRIAL LIQUIDS HAVING MULTIPLE SIZED DEBRIS

BACKGROUND OF THE INVENTION

This invention is related to apparatus for filtering industrial liquids through a filter medium mounted on a continuous conveyor, and more particularly to a filtering belt conveyor having upper and lower runs, means for removing larger debris as the upper run reverses course downwardly toward the lower run, a high pressure spray for removing smaller debris from the lower run remaining after removal of the larger debris, and a drag conveyor for removing the smaller debris from the sludge tank.

Some industrial processing liquids, such as used in metal-cutting machine cooling, process the liquid through a filtering medium so that the liquid can be recycled to the metal cutting process. Typically, the liquid is delivered to a tank having a filtering medium mounted on an elongated continuous belt conveyor. The liquid is passed through the filtering medium and then removed from the tank for recycling through the metal cutting process.

Examples of such prior art may be found in U.S. Pat. No. 5,089,143 issued Feb. 18, 1992 to Raymond L. Anderson, for Method of Filtering Industrial Liquids and Apparatus therefore; U.S. Pat. No. 3,706,378 issued Dec. 19, 1972 to John P. Markwick for Automatic Endless Belt Type Filter; and U.S. Pat. No. 4,242,205 issued Dec. 30, 1980 to Gene Hirs for Traveling Belt Filter.

In my co-pending patent application, I disclose a fluid filter belt conveyor comprising an elongated horizontal loop type filter belt enclosed within a drag chain conveyor. This arrangement permits the capacity of the filter to be enlarged by elongating the length of the filter loop.

SUMMARY OF THE INVENTION

The broad purpose of the present invention is to provide an improved conveyor for removing both large and small debris from the filter medium. In the preferred embodiment of the invention, the conveyor comprises an elongated continuous belt having a lower horizontal portion and an inclined portion. The liquid containing debris that is to be removed is introduced into a tank on the moving belt. The filter belt then travels upwardly to carry the debris to a level above the liquid in the tank, and then toward an outlet opening. As the upper run of the conveyor advances down toward the lower run, the larger debris falls off the belt into a collection bin.

To assist in trapping the debris as the belt travels upwardly out of the liquid, the belt has a series of vertical bars on the outer surface of the belt. The bars assist in preventing the debris from sliding down the rising belt. The bars serve a dual function. They scrape the tank floor to prevent sedimentation.

A plate as wide as the belt is mounted a few inches above the inclined portion of the belt that is raising the debris from the liquid. The plate traps debris between the plate and the belt thereby preventing the debris from backing down the rising belt.

A spray dislodges smaller debris that clings to the belt after it has passed the outlet opening. The smaller debris settles by gravity into a secondary tank. A drag conveyor mounted beneath the inclined portion of the filter conveyor drags the dislodged smaller debris up a ramp toward the outlet opening.

A novel drive is disclosed for connecting a conventional motor to drive both the filter conveyor and the drag conveyor.

In addition, the preferred embodiment has a novel means for connecting the filter belt to the conveyor drive chain.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
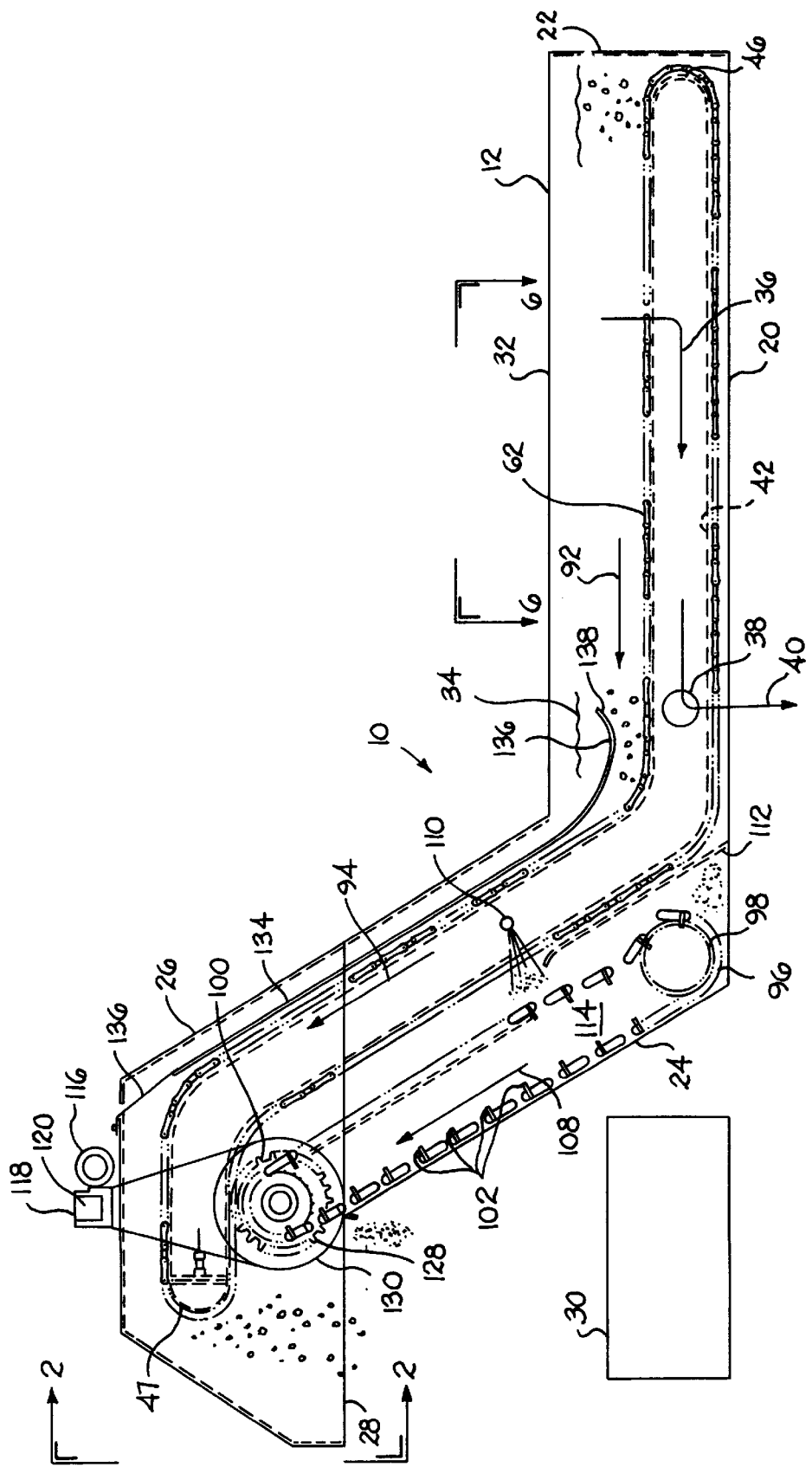
FIG. 1 is a sectional view of a filter apparatus illustrating the invention.
Figure 3:
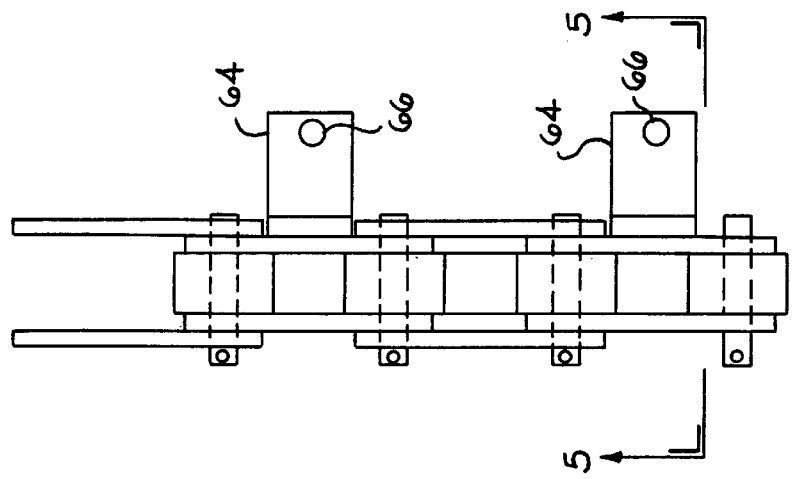
FIG. 3 is an enlarged view of a typical section of chain.
Figure 2:
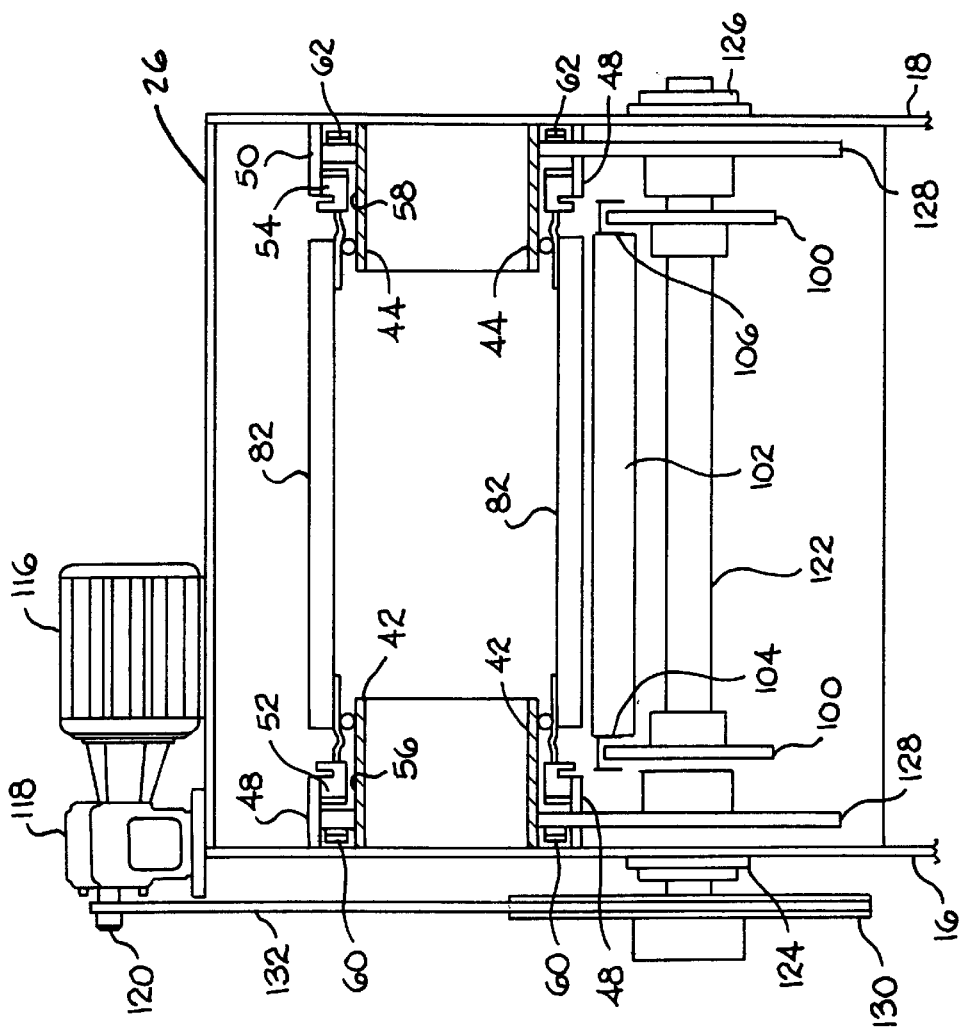
FIG. 2 is an enlarged sectional view as seen along lines 2—2 of FIG. 1.
Figure 6:
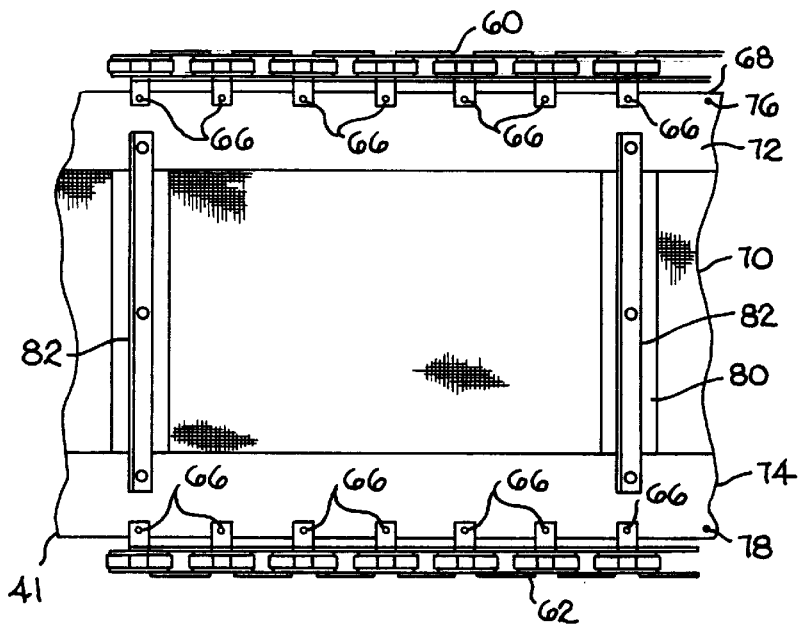
FIG. 6 is a view of the conveyor belt as seen along lines 6—6 of FIG. 1.
Figure 4:
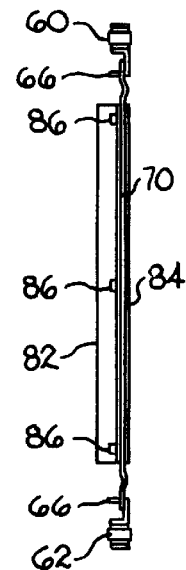
FIG. 4 is a cross sectional view of the belt illustrating a scraper bar.

Referring to FIGS. 1 and 6, a preferred filtration apparatus, generally illustrated at 10, includes a tank 12. As best shown in FIGS. 1 and 2, tank 12 is elongated and includes a pair of side walls 16 and 18 connected to a bottom wall 20. The side walls have an identical configuration. The right end of the bottom wall, as viewed in FIG. 1, terminates at end wall 22. Hood 26 is mounted on the upper end of the side walls, the left end wall and a ramp 24. Ramp 24 forms an inclined extension of bottom wall 20.

Hood 26 extends beyond the ramp to define an outlet opening 28 for dropping debris into a collection bin 30.

The tank receives liquid through a top opening 32. The liquid is generally maintained at a level 34 in the tank. The liquid passes downwardly, in the direction of arrow 36 and then horizontally to a suitable outlet opening 38 for recycling in a metal-cutting process, not shown, in the direction of arrow 40. The unfiltered liquid passes through a filter belt 41 as illustrated in FIG. 6.

Continuous annular guide ledges 42 and 44 are attached to the inside of side walls 16 and 18 and hood 26, as illustrated in FIG. 2. The guide ledges have a horizontal section in the tank, an inclined section in the ramp section of the tank, and a top horizontal section housed in the hood. The guide ledges include curved sections 46 and 47 at the right and left ends of the tanks as viewed in FIG. 1.

Figure 5:
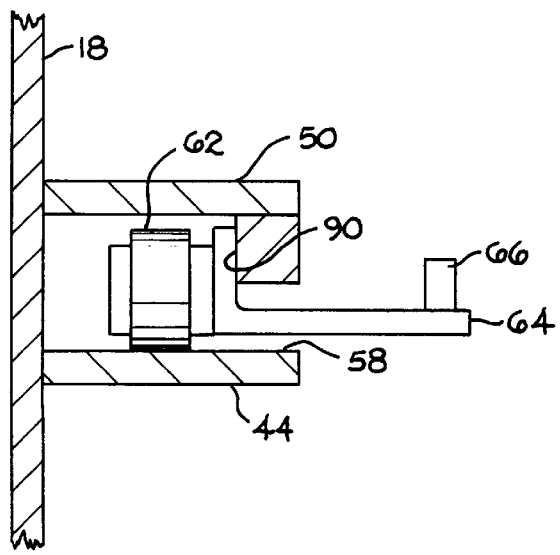
FIG. 5 is an enlarged view showing the manner in which the belt is attached to the chain as seen along lines 5—5 of FIG. 3.

Referring to FIG. 5, a pair of narrower annular walls 48 and 50 are mounted parallel to ledges 42 and 44, with their inner ends attached to the inside surfaces of the tank side walls and the hood, forming a channel on opposite sides of the tank defining a path for the drive chains.

A pair of continuous wear bars 52 and 54 are carried on the inside surface of walls 48 and 50. The wear bars form openings 56 and 58 between the wear bars and guide ledges 42 and 44.

Referring to FIG. 2, a pair of endless link chains 60 and 62 ride around the enclosed surface of guide ledges 42 and 44. Each pair of rollers on the chain carry an L-shaped support 64, which in turn carries a vertical pin 66. The pins are therefore carried at evenly spaced positions along the chain.

Filter belt 41 has a relatively wide mid-section of a fabric filtering medium 70 sewn to a pair of high strength fabric side strips 72 and 74. The filter medium, for illustrative purposes, is a conventional material such as a permanent monofilament having a mesh opening chosen according to the nature of the debris being removed from the liquid. Side strips 72 and 74 have a pair of parallel grommets 76 and 78, respectively, which receive pins 66 in order to form a connection with the drive chains.

Fabric filtering medium 70 is formed in strips that are sewn to a high strength fabric 80.

A series of parallel, spaced angular, metal scraper bars 82 are attached to the fabric 80 by metal strips 84 with fastener means 86 which clamp fabric 80 between bars 82 and strips 84. The high strength fabric provides reinforcement for carrying scraper bars 82, which are supported in a transverse direction with respect to the length of the filter belt.

Referring to FIG. 5, the drive chain rollers slide along ledges 42 and 44 while the L-shaped pin supports 64 slide along a wear surface 90. This provides a simple mechanism for guiding the chains as well as for supporting the filter medium.

Referring to FIG. 1, the upper run of the filter belt moves horizontally in the direction of arrow 92 picking up the debris as the liquid is introduced in the tank. The belt then rises in the direction of arrow 94 where the debris is carried by scraper bars 82 up the incline. The upper run then moves horizontally on the guide ledges toward curved section 48, which is disposed above outlet opening 28. The chain and the filter media advance down the inclined ramp in the reverse direction toward the bottom wall of the tank where the scraper bars stirs up any sediment that has collected in the tank.

The filter belt moves in a counter clockwise direction along this path of motion.

A drag conveyor 96 is mounted between the inclined portion of the filter belt path and ramp 24. The drag conveyor includes a tail sprocket 98 mounted adjacent the base of the ramp, and a drive sprocket 100 mounted beneath the horizontal upper path of the filter belt. The drag conveyor comprises a series of horizontal, spaced scraper bars 102 having their opposite ends connected to a pair of drag chains 104 and 106 to move in a generally clockwise direction in the direction of arrow 108, best shown in FIG. 1. The lower runs of the drag chains slide upwardly along ramp 24.

A high pressure fluid spray 110 is mounted between the upper and lower runs of the filter belt, and discharges fluid through the lower run toward the drag conveyor. The spray extends the full width of the filter medium to dislodge the smaller debris on the outside surface of the filter medium.

A partition 112 is connected to the tank side walls and the bottom of the main tank to form a secondary tank 114 for collecting the falling smaller debris. Scraper bars 102 move the smaller debris up the ramp 24 to outlet opening 28.

Referring to FIG. 2, both conveyors are driven by a single conventional motor 116 and gearbox 118 installed on hood 26. The gear box has an output shaft 120. A drive shaft 122 has its opposite ends journalled to the side walls of the hood by bearing means 124 and 126. The drive shaft carries a pair of drive sprocket means 100 which are connected to drag conveyor chains 104 and 106, and a second pair of sprockets 128 which, in turn, are meshed with chains 60 and 62, respectively, for driving the filter belt.

A larger sprocket 130 is carried on the end of drive shaft 122 and connected by a drive chain 132 to gearbox shaft 120. This relatively simple arrangement permits one motor to drive both the filter conveyor and the drag conveyor through a single drive shaft 122 while moving the filter conveyor in a generally counterclockwise direction and the drag conveyor in a clockwise direction.

Still referring to FIG. 1, a plate 134 which extends the full width of the filter belt, is mounted between the side walls of the tank and the hood. Plate 134 is spaced a slight distance above the filter belt along a major portion of its inclined length and attached by an articulated support 136 at its upper to the top of the hood so that the plate has a certain degree of resiliency for receiving the debris between plate 134 and the filter belt. The lower end of plate 134 is beneath the liquid level, and curved at 136 to provide a throat opening 138 for receiving the debris. The debris is trapped between the filter media, scraper bars 82, and plate 134, assisting the filter belt in removing debris from the liquid toward collection bin 30.

I have described a novel filtration belt suspended between laterally opposed chains, which ride around guide ledges on the inside of the tank. Liquids flow through the filter, which removes the solid materials from the liquid. The chains convey the solid materials out of the liquid up the inclined ramp. Larger debris fall from the belt at the outlet opening into the collection bin, while the smaller debris, which adheres to the filter belt, is dislodged by spray 110. This material then settles by gravity into the secondary tank where the drag conveyor drags the debris up the ramp toward the outlet opening.

Having described my invention, I claim:

1. A filtration apparatus, comprising:

tank means for receiving a liquid containing larger debris and smaller debris to be filtered from the liquid;

said tank means having two spaced upstanding sidewalls and a bottom wall;

an endless annular support ledge projecting from each sidewall of the tank means above the bottom wall;

an endless filtration belt supported between said side walls, said filtration belt having marginal side edges movably mounted on the support ledges such that a lower section of the belt is disposed in a liquid contained in the tank, and an upper section thereof is disposed above the liquid, the belt having an upper run for removing both the larger debris and the smaller debris from the liquid, and a lower return run beneath the upper run connected by a reversed section;

power means for moving the filtration belt along said support ledges through said reversed section in which the belt reverses direction to move into the lower run;

means for introducing unfiltered liquid into said tank means whereby said larger debris and said smaller debris collect on the belt surface; and the larger debris carried on the upper run falls toward a debris collection area as the belt moves around the reversed section;

liquid spray means for spraying a pressurized liquid through the lower run of the belt to dislodge the smaller debris remaining on the belt after the belt has passed said reversed section;

drag conveyor means for removing the smaller debris from the tank means; and a partition in the tank means forming a collection area for the smaller debris dislodged from the belt by the liquid spray means.

2. A filtration apparatus as defined in claim 1, including:
  power means connected to a dual-purpose shaft for driving both the filtration belt and the drag conveyor.

3. A filter apparatus as defined in claim 1, in which the drag conveyor is located beneath the return run of the filtration belt.

4. A filter apparatus as defined in claim 1, including a wall fixed with respect to the tank means, adjacent the path of motion of the upper run of the filtration belt for trapping debris between the belt and said wall as the belt moves up an inclined portion from the liquid in the tank toward the debris collection area.

5. A filtration apparatus as defined in claim 1, including a scraper bar mounted on the belt for pushing the debris on the belt as the belt is raised out of the liquid, and for dislodging debris on the tank bottom as the scraper bar is moved along the lower run of the belt.

6. A filtration apparatus as defined in claim 1, including a wall disposed parallel to the belt and spaced therefrom to form a pocket for trapping the debris as it is raised by the belt out of the liquid.

7. A filtration apparatus as defined in claim 1, including a wall disposed parallel to the belt and spaced therefrom to form a pocket for trapping the debris as it is raised by the belt out of the liquid.

8. A filtration apparatus as defined in claim 1, in which the power means for moving the belt includes an endless chain, a plurality of pins spaced along the chain and carried therewith, a plurality of perforations carried adjacent a side edge of the belt for receiving the pins such that the belt moves with the chain.

9. A filtration apparatus as defined in claim 8, including a wear bar supported along and adjacent the support ledge to define an opening, the chain being slidably disposed in the support ledge; and an L-shaped support having a first leg slidable disposed on the wear bar on the opposite side thereof as the belt, and a second leg supporting at least one of said pins.

* * * * *